United States Patent
Guillou et al.

(10) Patent No.: US 11,779,879 B2
(45) Date of Patent: Oct. 10, 2023

(54) PROCESS AND SYSTEM FOR PRETREATING GASEOUS EFFLUENT FOR POST-COMBUSTION CO2 CAPTURE

(71) Applicant: IFP Energies nouvelles, Rueil-Malmaison (FR)

(72) Inventors: Florent Guillou, Rueil-Malmaison (FR); Berenice Moroy, Rueil-Malmaison (FR); Vania Santos-Moreau, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 22 days.

(21) Appl. No.: 17/374,312

(22) Filed: Jul. 13, 2021

(65) Prior Publication Data

US 2022/0040630 A1 Feb. 10, 2022

(30) Foreign Application Priority Data

Jul. 29, 2020 (FR) ...................................... 2008002

(51) Int. Cl.
*B01D 53/96* (2006.01)
*B01D 53/14* (2006.01)
*B01D 53/40* (2006.01)
*B01D 53/62* (2006.01)
*B01D 53/78* (2006.01)

(52) U.S. Cl.
CPC ..... *B01D 53/1493* (2013.01); *B01D 53/1425* (2013.01); *B01D 53/1475* (2013.01); *B01D 2257/504* (2013.01); *B01D 2258/0283* (2013.01)

(58) Field of Classification Search
None
See application file for complete search history.

(56) References Cited

U.S. PATENT DOCUMENTS

| 2007/0006565 | A1 | 1/2007 | Fleischer et al. | |
| 2010/0162703 | A1* | 7/2010 | Li | F02C 9/00 60/670 |
| 2012/0061614 | A1* | 3/2012 | Calabro | B01D 53/1475 423/229 |
| 2013/0149767 | A1 | 6/2013 | Marion et al. | |
| 2021/0402347 | A1* | 12/2021 | Szabo | C10K 1/004 |

FOREIGN PATENT DOCUMENTS

| EP | 1656983 A1 | 5/2006 |
| EP | 2228119 A1 | 9/2010 |
| FR | 2948578 A1 | 4/2011 |
| FR | 2983863 A | 6/2013 |

OTHER PUBLICATIONS

French Preliminary Search Report dated Mar. 25, 2021 from French application FR 2008002.

* cited by examiner

*Primary Examiner* — Daniel Berns
(74) *Attorney, Agent, or Firm* — FITCH, EVEN, TABIN & FLANNERY, LLP

(57) ABSTRACT

The present invention concerns the field of capturing the $CO_2$ from a gaseous effluent. The incoming gaseous effluent is burned with a fuel, so as to obtain a hot gaseous effluent rich in acidic compounds, and the hot gaseous effluent rich in acidic compounds is cooled to give a cold effluent rich in acidic compounds, which is subsequently used in the step of contacting with an absorbent solution rich in acidic compounds.

12 Claims, 1 Drawing Sheet

[Fig 1]
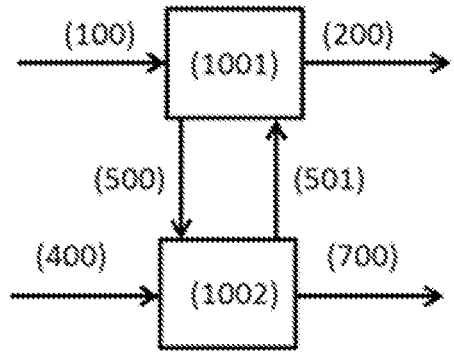
[Fig 2]
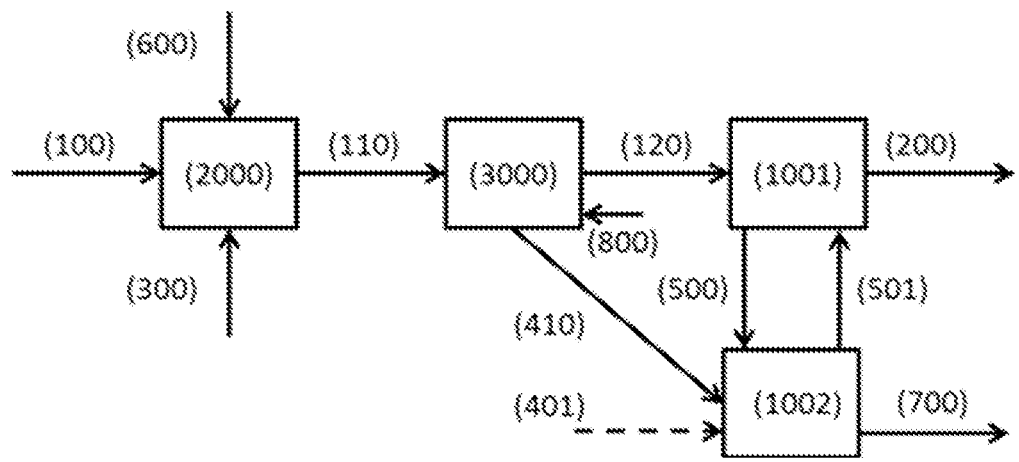
[Fig 3]
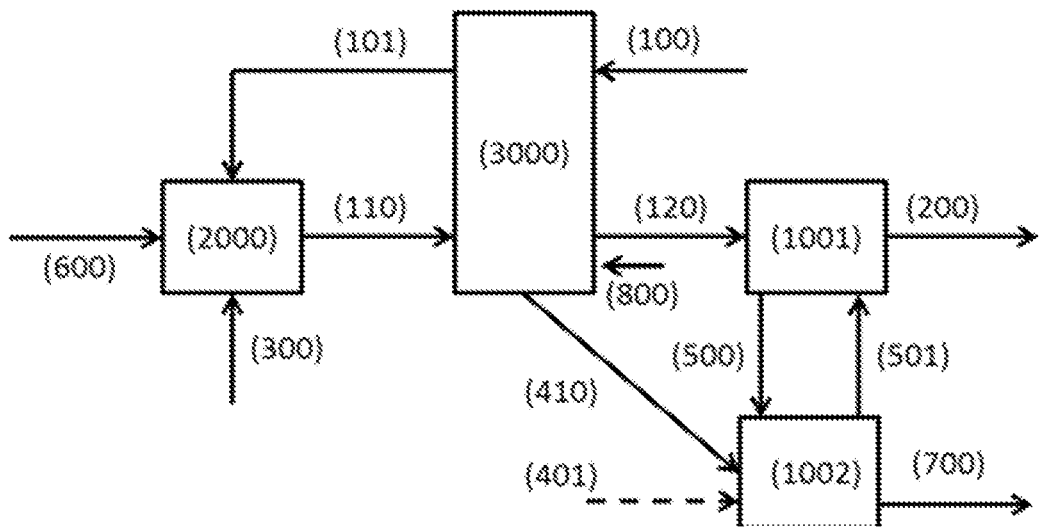

PROCESS AND SYSTEM FOR PRETREATING GASEOUS EFFLUENT FOR POST-COMBUSTION CO2 CAPTURE

CROSS-REFERENCE TO RELATED APPLICATIONS

This application claims priority from French Patent Application No. 20/08.002 filed Jul. 29, 2020, which is hereby incorporated herein by reference in its entirety for all purposes.

TECHNICAL FIELD

The present invention concerns the field of capturing the $CO_2$ from a gaseous effluent. The $CO_2$ capture process, which may form part of a CCS (Carbon Capture and Storage) method, involves trapping the $CO_2$ molecules before, during or after the step of industrial combustion, so as to avoid it being released into the atmosphere and thus to control the emission of greenhouse gases. Three classes of capture process are envisaged accordingly:
- pre-combustion: relating to capture before industrial combustion,
- post-combustion: relating to capture after conventional industrial combustion (with air), with little or no modification of the combustion process,
- oxy-fuel combustion: relating to capture after combustion with pure oxygen.

The present invention relates to post-combustion capture.

Among the solutions for reducing $CO_2$ emissions, $CO_2$ Capture and Storage (CCS) technologies are undergoing development for use by industrial emitters. These CCS technologies are essential for achieving the objectives set at the Paris Climate Conference in December 2015 (COP21). These technologies will be required to make a 12% contribution to reduced emissions of $CO_2$ in 2050 if global warming is to be limited to 2° C. between now and 2100. Responding to the need for post-combustion $CO_2$ capture, a variety of effective technologies are under development. The most promising technologies for $CO_2$ capture from flue and industrial gases are currently absorption technologies using solvents. Most of the solvents used can break down in the presence of oxygen. For optimal use of the process, the concentration of oxygen in the flue or industrial gases must be minimized.

As far as the future is concerned with regard to $CO_2$, advantage is apparent from application to cement works, metallurgical sites and similar industrial sites, for example the production of lime, more particularly in respect of the following problems:
- the production process in a cement works produces substantial amounts of $CO_2$,
- the energy needed to capture the $CO_2$ is very great, equivalent to that used in operating the production process,
- the combustion flue gases are rich in $CO_2$,
- the flue gases are rich in oxygen $O_2$.

Where $CO_2$ capture processes are used that involve solvent absorption, this last point is critical, as it may affect the breakdown of the solvent and therefore the operating costs of the process, since the volume of solvent has to be replaced more often. The reason is that the gaseous effluents, such as the natural gas and the combustion flue gases, for example, are generally deacidified by washing with an absorbent solution. The absorbent solution allows the acidic compounds present in the gaseous effluent ($H_2S$, mercaptans, $CO_2$, COS, $SO_2$, $CS_2$) to be absorbed.

The skilled person is well aware, however, that the amines which may be used as solvent have the drawback of breaking down under the conditions of service. More particularly, the amines may be broken down by the oxygen, causing the amine to be consumed and breakdown products to form that accumulate in the unit or, in the case of those which are most volatile, that are entrained into the gaseous effluents of the process. Thus, especially in the post-combustion treatment of flue gases, in a process using an aqueous solution of monoethanolamine (MEA), substantial amounts of ammonia may be formed. The ammonia thus formed is carried into the atmosphere along with the treated flue gases, posing problems in respect of environmental protection.

Another problem scenario contemplated in the context of the $CO_2$ capture process, and especially for absorption processes of post-combustion capture, is the need to produce low- or medium-pressure steam for the solvent regeneration phase. The cost of the captured $CO_2$ will be highly dependent on the amount of steam needed and the cost of this steam. In sites where steam from the industrial process cannot be recovered residually, or not sufficiently to meet the needs of the process, the cost of the $CO_2$ will increase significantly.

PRIOR ART

The relevant prior art is made up of post-combustion $CO_2$ absorption processes for $CO_2$ capture. Three processes are of particular interest: Hicapt™, Hicapt+™ and DMX™ (IFP Energies nouvelles, France). The HiCapt+™ process comprises additives for mitigating the breakdown of the solvent by oxygen.

FR2948578 discloses a Hicapt+™ process comprising an absorbent solution containing a breakdown inhibitor deriving from a triazole or a tetrazole, and a process for absorbing acidic compounds contained in a gaseous effluent.

EP2228119A1 discloses a Hicapt+™ process employing the deacidification of a gas with an absorbent solution, featuring an optimized water washing section.

EP1656983A1 discloses a DMX™ process which proposes the deacidification of a gas with an absorbent solution, featuring fractional regeneration.

Furthermore, the level of residual oxygen in the industrial combustion flue gases shortens the lifetime, by accelerating the breakdown of the solvent, with an adverse effect on the operating costs of the process, as the solvent has to be replaced more often.

SUMMARY OF THE INVENTION

The present invention proposes a process and a system for reducing the breakdown of an absorbent solution used for absorbing the acidic compounds contained in a gaseous effluent, the absorbent solution comprising amines in aqueous solution. To do this, the invention aims to reduce the level of oxygen contained in the treated flue gases.

The present invention concerns a process for deoxygenating flue or industrial gases before capture of the $CO_2$ with production of steam. By virtue of this invention it is possible a) to reduce the concentration of $O_2$ in the flue gases and, optionally, b) to produce steam which is used in the solvent regeneration phase to limit the energy supplied for the solvent regeneration phase.

A proposal in the present invention is to remove the oxygen from the flue gases by burning a fuel with the oxygen-rich flue gases as oxidizer. The amount of oxygen, and hence of oxidizer, available in the flue gases is enough to supply the required regeneration energy (from one-third to the entirety, depending on the $O_2$ content of the flue gases), thus showing the advantage of exploiting this advantageous synergy.

The invention lies in a process for separating at least one acidic gas contained in an incoming gaseous effluent, containing at least the following steps:
  contacting, in a separation unit, a cold gaseous effluent rich in acidic compounds with an absorbent solution low in acidic compounds so as to obtain a gaseous effluent low in acidic compounds and an absorbent solution rich in acidic compounds,
  regenerating at least a fraction of the absorbent solution rich in acidic compounds in a regeneration column so as to obtain an absorbent solution low in acidic compounds and an effluent rich in acidic compounds, said absorbent solution low in acidic compounds being used in the step of contacting with said cold effluent rich in acidic compounds,
  the separation process further comprises the following steps of deoxygenation of the incoming gaseous effluent:
  burning, in a combustion device, the incoming gaseous effluent with a fuel, so as to obtain a hot gaseous effluent rich in acidic compounds,
  cooling the hot gaseous effluent rich in acidic compounds in an exchanger to give the cold effluent rich in acidic compounds used in the step of contacting with an absorbent solution low in acidic compounds.

In one embodiment the quality of the hot effluent rich in acidic compounds may be controlled with the addition, to the combustion device, of at least one supplementary oxidizer.

In one embodiment a fluid in high-pressure liquid form may be introduced into the exchanger, to cool the hot gaseous effluent rich in acidic compounds, from which a fluid in high-pressure vapor form is withdrawn. With preference said fluid in high-pressure vapor form may be used as an energy source for operating the regeneration column.

In one embodiment the quality of the operation of the regeneration column may be controlled with the addition of a complementary fluid in supplementary high-pressure vapor form.

In one embodiment a step may be introduced of reheating the incoming gaseous effluent before introducing it, in hot incoming effluent form, into the combustion device.

In one embodiment the incoming gaseous effluent may be reheated by introducing it into an exchanger, from which it is taken out in hot incoming gaseous effluent form.

In one embodiment the hot gaseous effluent rich in acidic compounds exiting the combustion device may be used for reheating the incoming gaseous effluent.

In one embodiment the incoming gaseous effluent may be a flue gas from a previous combustion, obtained in particular from an industrial process.

In one embodiment the effluent rich in acidic compounds may be stored underground, more particularly in exhausted or depleted oilfields or gas fields or in deep saline aquifers, or used to produce useful molecules, for example platform molecules for chemistry.

In one embodiment the fuel may be a discard from wastes or from biomass.

In one embodiment said at least one supplementary oxidizer may be dioxygen $O_2$.

In one embodiment said at least one acidic gas may comprise at least one of the compounds including carbon dioxide $CO_2$.

In one embodiment the absorbent solution rich in acidic compounds and the absorbent solution low in acidic compounds may be two states of the same solvent, comprising an amine solution with reactive compounds in aqueous solution, said two solutions containing greater or lesser amounts of acidic compounds.

The invention also lies in a system for separating at least one acidic gas contained in an incoming gaseous effluent, suitable for implementing the process of the invention.

Other features and advantages of the process according to the invention will become apparent on reading the following description of non-limiting exemplary embodiments, with reference to the appended figures described below.

LIST OF FIGURES

FIG. 1 illustrates a combustion scheme according to the prior art.

FIG. 2 illustrates a combustion scheme according to a first embodiment of the invention.

FIG. 3 illustrates a combustion scheme according to a second embodiment of the invention.

DESCRIPTION OF THE EMBODIMENTS

FIG. 1 presents a scheme of a process for separating at least one acidic gas contained in a gaseous effluent according to the prior art. Consideration is given to an incoming gaseous effluent from industrial combustion (for example flue gas, industrial gas, etc.) (100) which may contain oxygen in the form of dioxygen ($O_2$). $O_2$ may be present in the flue or industrial gas because during industrial combustion it may be in excess in order to ensure both the completion of the industrial combustion and the control of the temperature. The oxygen may also come from leakage of ambient air into the flue gas line, insofar as the combustion devices are generally operated at reduced pressure for safety reasons relative to their environment. This combustion effluent may come from the combustion of fossil, synthetic or natural carbonaceous matter (converted or not). This combustion effluent hence typically contains a substantial amount of acidic compounds (particularly $H_2S$, mercaptans, $CO_2$, COS, $SO_2$, $CS_2$), for example carbon dioxide ($CO_2$) from the combustion. The description hereinafter addresses only the carbon dioxide instance, though the process is applicable to all types of acidic compounds (for example $H_2S$, mercaptans, $CO_2$, COS, $SO_2$, $CS_2$). This $CO_2$ is absorbed in the separation unit (1001), which is also called an absorber. The effluent low in acidic compounds (200) from the separation unit (1001) is a flue gas whose $CO_2$ content will have been substantially lowered. The separation unit (1001) provides a $CO_2$ separation function by adsorption or by absorption.

In the case of $CO_2$ separation by means of an amine-based solvent, this absorber is a gas/liquid contactor which contacts the incoming gaseous effluent for treatment (100) with a liquid absorbent solution low in acidic compounds (501), also termed an amine solution. This amine solution becomes charged with $CO_2$ within the separation unit (1001).

The resulting solution is an absorbent solution rich in acidic compounds (500) and rich in $CO_2$, which is sent to a regeneration column (1002), also termed regenerator. The function of the regenerator is to extract the $CO_2$ contained in the effluent rich in acidic compounds (500), to form an exit gas (700) comprising the $CO_2$ extracted. This regeneration may be obtained by thermal effect and lowering of the $CO_2$ partial pressure in the gas phase at equilibrium with the amine solution in the regenerator. The LP (low-pressure) or MP (medium-pressure) hot utility (400) may be used to carry out the regeneration, for example by means of a reboiler (not shown). The regenerated amine solution (501) is called low-grade amine. It is sent to the absorber (1001) for capturing the $CO_2$.

The invention lies in a process for separating at least one acidic gas contained in an incoming effluent (100), comprising at least the following steps:
  contacting, in a separation unit (1001), a cold gaseous effluent rich in acidic compounds (120) with an absorbent solution low in acidic compounds (501) so as to obtain a gaseous effluent low in acidic compounds (200) and an absorbent solution rich in acidic compounds (500),
  regenerating at least a fraction of the absorbent solution rich in acidic compounds (500) in a regeneration column (1002) so as to obtain an absorbent solution low in acidic compounds (501) and an effluent rich in acidic compounds (700), said absorbent solution low in acidic compounds (501) being used in the step of contacting with said cold effluent rich in acidic compounds (120),
  burning, in a combustion device (2000), the incoming effluent (100) with a fuel (300), so as to obtain a hot gaseous effluent rich in acidic compounds (110), and
  cooling the hot gaseous effluent rich in acidic compounds (110) in an exchanger (3000) to give the cold effluent rich in acidic compounds (120) used in the step of contacting with an absorbent solution low in acidic compounds (501).

The steps of contacting in the separation unit (1001) and of regeneration may conform to the prior-art process, particularly as described in relation to FIG. 1. The steps of burning and of cooling of the hot gaseous effluent are steps of deoxygenating the incoming gaseous effluent (100).

FIG. 2 provides a non-limiting description of the process in a first embodiment of the invention, including a number of embodiment options. These embodiment options may be contemplated independently of one another. This figure shows an incoming gaseous effluent (100), also termed combustion flue gas, which in this case is treated in the combustion device (2000). The combustion device (2000) has a dual function. The first function of this combustion device (2000) is to lower the $O_2$ content of the flue gas (100) so as to reach a value compatible with the operation of the amine selected for operating the separation unit (1001) and the regeneration column (1002). The second function of this combustion device (2000) is to increase the energy content of the combustion flue gas (100) by a substantial increase in its temperature. These two functions are ensured by the burning of a fuel or of a fuel mixture (300). This carbonaceous feed may be the same as the feed whose industrial combustion led to the make-up of the incoming gaseous effluent (100), or a different feed.

In one embodiment of the invention, the fuel (300) may be a discard from wastes or from biomass. Thus, in a context of reducing the environmental footprint, this feed may be, for example and non-limitingly, an industrial waste or a reject from a center for recovery of value from wastes or from biomass such as forestry residues, agricultural by-products or energy crops. In this latter instance of biomass, the downstream capture of $CO_2$ results in the negative emissions being accounted for, and is particularly favorable in terms of the balance of greenhouse gas emissions.

Another oxidizer which may have a positive effect on the emissions is hydrogen. This is because it is a high-energy-value oxidizer and its combustion product, water, can be directly utilized and separated simply from the flue gases. This is, moreover, an advantageous pathway to hybridization of processes between fuel and electricity, as the latter can be easily exploited to give hydrogen by means of devices such as electrolysers. An advantage offered by this hybridization is its flexibility according to the amount of decarbonized electricity available in the networks, in excess or not.

The result of this combustion is a hot effluent rich in acidic compounds (110) with an oxygen content which can be brought below the threshold recommended by the supplier of amine-based solvent, i.e. generally below 10% on a dry basis, and preferably below 6% on a dry basis.

If needed, as for example in the case of a lack of oxidizer that means the energy supply required for regeneration cannot be achieved through combustion, it is possible in one embodiment to employ supplementary air (600). In one embodiment, indeed, the quality of the hot effluent rich in acidic compounds (110) may be controlled with the addition, to the combustion device (2000), of at least one supplementary oxidizer (600). In one embodiment of the invention, said at least one supplementary oxidizer (600) may be dioxygen $O_2$.

This effluent rich in acidic compounds (110) is cooled in a heat exchange device (3000) so as to produce a high-pressure steam fluid (410), also called hot utility, at sufficient temperature and in sufficient amount to regenerate the amine containing the captured $CO_2$ from an absorbent solution rich in acidic compounds (500), starting from the fluid in high-pressure liquid form (800). The reason is that, in one embodiment of the invention, the process may also comprise a step of introducing a fluid in high-pressure liquid form (800) into the exchanger (3000), from which a fluid in high-pressure vapor form (410) is withdrawn, which can also be referred to as fluid in pressurized vapor form. In other words, within the exchanger (3000), the fluid in high-pressure liquid form (800) recovers heat energy from the hot effluent rich in acidic compounds (110) to form a hot utility (410) and an effluent rich in acidic compounds (120), which exits it in cooled form.

In one embodiment of the invention, said fluid in high-pressure vapor form (410) may be used as an energy source for operating the regeneration column (1002). The use of the fluid in high-pressure vapor form (410) as an energy source for operating the regeneration column (1002) is particularly useful in the sense that condensing this vapor in the reboiler is an effective way of transmitting heat to the process. As a non-limiting example, said fluid in high-pressure vapor form (410) may be a saturated vapor with a defined condensation point of the order of 10 to 20° C. above the operating temperature of the reboiler intended for regenerating the solution of amines. Thus in the case of a 30 wt % solution of MEA in water, operation may typically take place at 120° C., corresponding to supply of a vapor with a condensation point of 140° C. An air supplement (600) may be used (insofar as is acceptable given the capacity of the unit in terms of flow rate and temperature, especially when an existing plant is adapted to add a $CO_2$ capture device) to increase the amount of fuel which can be burned to produce the hot effluent rich in acidic compounds (110) so as to increase the energy content of the high-pressure vapor fluid (410).

In one embodiment, this energy provision may also be made up with an external provision of energy in the form of a supplementary high-pressure vapor fluid (401). In one embodiment of the invention, indeed, the quality of the operation of the regeneration column (1002) may be controlled with the addition of a complementary fluid in supplementary high-pressure vapor form (401).

The reason is that the oxygen content of the incoming gaseous effluent (100) is not always enough to bring about the combustion of a sufficient amount of fuel to regenerate the amount of solvent corresponding to the entirety of the $CO_2$ it is desired to capture. As an example, this is typically the case for an MEA solvent for flue gases containing more than 20% of $CO_2$ and less than 5% of $O_2$ on a dry basis. This supplement in the form of the supplementary high-pressure vapor fluid (401) may then be predominant without any loss of the benefit of an energy contribution of the utility in the form of the high-pressure vapor fluid (410). Generally speaking, effort is made, when possible, to harmonize to the greatest degree possible the systems for producing hot utilities in the form of the high-pressure vapor fluid (401) and in the form of the high-pressure vapor fluid (410) in such a way as to optimize the energy balance of the whole system; this may, for example, mean a partial reheating of the fluids used to produce the high-pressure vapor fluid (401) on the pathway of the flue gases between the incoming gaseous effluent (100) and the effluent low in acidic compounds (200) and especially in the heat exchange device (3000) (not shown). In the exchanger (3000), the first function, via exchange of heat with the reheated flow in the form of the hot effluent rich in acidic compounds (110), is to produce the hot utility in the form of the high-pressure vapor fluid (410). The exchanger (3000) may also contain supplementary heat exchangers for producing a flow in the form of the cold effluent rich in acidic compounds (120), which has a temperature compatible with optimal operation of the selected amine, typically below 50° C. for a 30 wt % solution of MEA amine in water.

In one embodiment of the invention, the process may also comprise a step of reheating the incoming gaseous effluent (100) before introducing it, in hot incoming effluent (101) form, into the combustion device (2000).

The incoming gaseous effluent (100) may preferably be reheated by introducing it into an exchanger (3000), from which it is taken out in hot incoming effluent (101) form.

FIG. 3 represents a second embodiment of the invention, which contains an additional step relative to the embodiment of FIG. 2, of reheating the $CO_2$-rich effluent, the incoming gaseous effluent (100), in a heat exchanger (3000) so as to produce the flow in the form of the hot incoming gaseous effluent (101), the temperature of which is selected to facilitate the ignition of the fuel (300) on contact with the oxygen contained in the hot incoming gaseous effluent (101). Typically, for a known partial pressure of oxygen and a known concentration of a specific fuel, it is possible to define an autoignition point, which can be an element enabling a definition of the minimum temperature the flow of the hot incoming gaseous effluent (101) must reach for attaining complete combustion of the fuel (300). This minimum temperature may also be lowered by using devices such as catalytic burners. The preheating of the incoming gaseous effluent (100) to make hot incoming gaseous effluent (101) may be performed by exchange of heat with a dedicated hot utility (not shown), by thermal integration with the device for producing the supplementary hot utility in the form of supplementary high-pressure vapor fluid (401) where appropriate (not shown) or by integration in effluent charge around the combustion device (2000) such as a dedicated heat exchange zone of the heat exchange device (3000) as shown in FIG. 3. For this latter variant embodiment, within the exchanger (3000), the fluid in high-pressure liquid form (800) and also the incoming gaseous effluent recover heat energy from the hot effluent rich in acidic compounds (110) to form a hot utility (410), a hot incoming gaseous effluent (101) and a cold effluent rich in acidic compounds (120). In other words, the hot gaseous effluent rich in acidic compounds (110) exiting the combustion device may be used for reheating the incoming gaseous effluent (100).

In one embodiment of the invention, the incoming gaseous effluent (100) may be a flue gas from a previous combustion, obtained in particular from an industrial process.

In one embodiment of the invention, the effluent rich in acidic compounds (700) may be stored underground, more particularly in oilfields.

In one embodiment of the invention, said at least one acidic gas may comprise at least one of the compounds including carbon dioxide $CO_2$.

In one embodiment of the invention, the absorbent solution rich in acidic compounds (500) and the absorbent solution low in acidic compounds (501) are two states of the same solvent, comprising an amine solution with reactive compounds in aqueous solution, said two solutions containing greater or lesser amounts of acidic compounds.

The invention also lies in a system for separating at least one acidic gas contained in an incoming gaseous effluent (100) suitable for implementing the process according to any one of the variants or combinations of variants of the process described above.

To illustrate the proposed solution, we refer to a process for absorbing $CO_2$ by washing with amines. The performance qualities contemplated are those of the washing process using 40% weight % monoethanolamine (MEA) for capturing $CO_2$ on a typical combustion flue gas from a coal-fired thermal power plant. These performance qualities were observed experimentally.

For each of the cases presented, the characteristics of the flue gas stream for treatment are as follows:

Conditions of the Incoming Gaseous Effluent (100)

TABLE 1

| Temperature | ° C. | 150 |
|---|---|---|
| Pressure | atm | 1 |
| Volume flow rate on dry basis | $Nm^3/h$ | 250,000 |

Reference case: $CO_2$ capture in combustion flue gases according to the prior art, cf. FIG. 1.

For simplification, the incoming gaseous effluent (100) is considered to be free of impurities such as SOx or NOx. Its oxygen content is about 5 vol % on a dry basis. The compositions of flue gases at the furnace exit are generally supplied on a dry basis. For the implementation of these examples, we shall consider hydrated flue gases containing 0.043 kg $H_2O$/kg dry gas (value retrieved from a typical combustion flue gas from a coal-fired thermal power plant). Its composition is as follows:

Flue Gas Composition, 5 vol % of $O_2$

TABLE 2

| Compound | vol % dry gas | dry basis Flow rate (Nm3/h) | Flow rate (kg/h) | wet basis Flow rate (kg/h) | wt % |
|---|---|---|---|---|---|
| CO2 | 14.12 | 3.53E+04 | 7.06E+04 | 7.06E+04 | 32.30 |
| N2 | 80.75 | 2.02E+05 | 1.28E+05 | 1.28E+05 | 58.78 |
| O2 | 5.13 | 1.28E+04 | 1.05E+04 | 1.05E+04 | 4.80 |
| H20 | 0 | 0 | 0 | 9.01E+03 | 4.12 |
| Total | 100 | 2.50E+05 | 2.10E+05 | 2.19E+05 | 100 |

The $CO_2$ absorber operating by washing with 40 wt % MEA within the separation unit (1001) produces an effluent low in acidic compounds (200), containing 90 wt % less $CO_2$. Its composition is presented in the table below:

Flue Gas Composition After $CO_2$ Capture with 40 wt % MEA

TABLE 3

| Compound | Composition of treated flue gas Flow rate (kg/h) | wt % |
|---|---|---|
| $CO_2$ | 7.06E+03 | 4.55 |
| $N_2$ | 1.28E+05 | 82.87 |
| $O_2$ | 1.05E+04 | 6.77 |
| $H_2O$ | 9.01E+03 | 5.81 |
| Total | 1.55E+05 | 100 |

The regeneration column (1002) requires a regeneration energy of 3.02 $GJ/t_{CO2\ captured}$. In FIG. 1 the vapor stream of the hot utility (400) returns to the regeneration column (1002). This base case as known in the prior art does not specify how the vapor is formed, but sets out the amount of vapor needed to capture 90% of the CO2 in the incoming gaseous effluent. The flow rate of vapor required as hot utility (400) for reboiling the solvent to capture 90 wt % of $CO_2$ by capture with 40 wt % MEA is indicated in the table below:

Characteristics of the $CO_2$ Capture with 40 wt % MEA

TABLE 4

| Flow rate of incoming gaseous effluent (100) | kg/h | 2.19E+05 |
|---|---|---|
| of which $CO_2$ flow rate | kg/h | 7.06E+04 |
| Flow rate of $CO_2$ captured (90 wt %) | kg/h | 6.36E+04 |
| Energy needed for regeneration | $GJ/t_{CO2captured}$ | 3.02 |
| Energy needed for regeneration | kJ/h | 1.92E+08 |
| Flow rate of hot utility (400) | kg/h | 8.86E+04 |

Case according to one embodiment of the invention: control of the oxygen content of an incoming gaseous effluent (100) containing $CO_2$ and supply of energy, with preheating of the effluent for treatment, in accordance with the embodiment of FIG. 3.

The performance characteristics of the device are compared over 3 cases with an incoming gaseous effluent (100) whose oxygen content on a dry basis is 5 vol % (same composition as the flue gas in the reference case), 10 vol % and 15 vol %. The flue gas compositions considered are as follows:

Flue Gas Composition—$3O_2$ Contents Tested

TABLE 5

| Compound | Case with 5 vol % of $O_2$ Flow rate (kg/h) | wt % (wet) | Case with 10 vol % of $O_2$ Flow rate (kg/h) | wt % (wet) | Case with 15 vol % of $O_2$ Flow rate (kg/h) | wt % (wet) |
|---|---|---|---|---|---|---|
| $CO_2$ | 7.06E+04 | 32.30 | 7.06E+04 | 31.96 | 7.06E+04 | 31.64 |
| $N_2$ | 1.28E+05 | 58.78 | 1.21E+05 | 54.65 | 1.13E+05 | 50.53 |
| $O_2$ | 1.05E+04 | 4.80 | 2.05E+04 | 9.26 | 3.07E+04 | 13.75 |
| $H_2O$ | 9.01E+03 | 4.12 | 9.11E+03 | 4.12 | 9.11E+03 | 4.08 |
| Total | 2.19E+05 | 100 | 2.21E+05 | 100 | 2.23E+05 | 100 |

The fuel (300) used in the device is methane at 7 bar and 25° C. and has an LHV of $5.003.10^4$ kJ/kg. Complete combustion with excess oxygen proceeds until the oxygen content reaches a value of 2 vol % in the flue gas stream exiting the combustion device (2000). The target oxygen content is variable but the aim is to minimize it so as to obtain a flue gas stream whose oxygen content does not cause excessive breakdown of the amine in the separation unit (1001). The lower the oxygen content selected, the greater will be the energy recovered for steam production, but there is also an effect on the amount of fuel consumed. This value can therefore be optimized.

The incoming gaseous effluent (100), which is initially at 150° C., is first heated to 650° C. in a heat exchange device (3000) using the hot effluent rich in acidic compounds (110) at the exit of the combustion device (2000) as hot fluid. The temperature of 650° C. is greater than the ignition temperature of the fuel (300), in this case methane, which is 540° C. This ensures combustion of the fuel with the flue gas for treatment. The temperatures observed for the various cases are presented in the table below. The greater the oxygen content of the incoming flue gas, the more combustion there will be in the device, hence a high exit temperature.

Temperatures Around the Heat Exchange Device (3000)

TABLE 6

| Stream | | Temperature Reference No. | Case with 5 vol % of $O_2$ | Case with 10 vol % of $O_2$ | Case with 15 vol % of $O_2$ |
|---|---|---|---|---|---|
| Flue gas preheat | Cold entry | 100 | 150 | 150 | 150 |
| | Cold exit | 101 | 650 | 650 | 650 |
| | Hot entry | 110 | 906.8 | 1286 | 1621 |
| | Hot exit | Not shown | 448 | 872.9 | 1243 |
| Heat recovery, vaporization | Hot entry | Not shown | 448 | 872.9 | 1243 |
| | Hot exit | 120 | 150 | 150 | 150 |
| | Boiling feed water | 800 | 140 | 140 | 140 |
| | 3.6 bar steam | 410 | 140 | 140 | 140 |

The flue gas stream exiting the combustion device (200) which has enabled preheating of the flue gas for treatment then makes it possible to produce steam by vaporization of boiling feed water at 140° C. and 3.6 bar (vapour conditions needed for the steam required to operate the regenerator with 40 wt % MEA solvent). This steam stream is then used as hot utility, high-pressure steam fluid (410) by the regeneration column (1002). The amount of steam produced is related to the amount of energy needed for regeneration of the MEA solvent, of 3.02 GJ/t $CO_2$ captured, which is itself linked to the amount of $CO_2$ it is possible to capture by absorption in the separation unit (1001). The performance values obtained in the 3 cases are presented in the following table:

Device Performance by the 3 Cases

TABLE 7

| | | Case with 5 vol % of $O_2$ | Case with 10 vol % of $O_2$ | Case with 15 vol % of $O_2$ |
|---|---|---|---|---|
| Flow rate of steam (410) generated | kg/h | 3.40E+04 | 9.08E+04 | 1.49E+05 |
| Available energy | kJ/h | 7.37E+07 | 1.97E+08 | 3.22E+08 |
| Energy for regeneration | GJ/t $CO_2$ captured | | 3.02 | |
| Flow rate of $CO_2$ captured in the separation unit (1001) | kg/h | 2.44E+04 | 6.51E+04 | 1.07E+05 |
| Total $CO_2$ flow rate | kg/h | 7.47E+04 | 8.15E+04 | 8.84E+04 |
| $CO_2$ flow rate avoided | kg/h | 2.03E+04 | 5.43E+04 | 8.88E+04 |
| Possible $CO_2$ capture rate | % | 32.69% | 79.94% | 120.56% |
| Level of $CO_2$ avoided | % | 28.80% | 76.85% | 125.74% |

NB: the $CO_2$ capture rate takes account of the further $CO_2$ generated by combustion in the combustion device (2000). The amount of $CO_2$ eventually emitted (after combustion device and $CO_2$ capture unit) by comparison with the amount of $CO_2$ which would initially have been emitted without any capture unit, when considered, leads to the concept of the level of $CO_2$ avoided.

The higher the oxygen content of the flue gas stream for treatment, the greater the amount of steam that will be produced, according to the invention, by heat recovery from the flue gases, and hence the greater the $CO_2$ capture rate by virtue of the process according to the invention.

The invention claimed is:

1. Process for separating at least one acidic gas contained in an incoming gaseous effluent, comprising at least the following steps:
    contacting, in a separation unit, a cold gaseous effluent rich in acidic compounds with an absorbent solution low in acidic compounds so as to obtain a gaseous effluent low in acidic compounds and an absorbent solution rich in acidic compounds,
    regenerating at least a fraction of the absorbent solution rich in acidic compounds in a regeneration column so as to obtain an absorbent solution low in acidic compounds and an effluent rich in acidic compounds, the absorbent solution low in acidic compounds being used in the step of contacting with the cold effluent rich in acidic compounds,
    burning, in a combustion device, the incoming gaseous effluent with a fuel, so as to obtain a hot gaseous effluent rich in acidic compounds,
    cooling the hot gaseous effluent rich in acidic compounds in an exchanger to give the cold effluent rich in acidic compounds used in the step of contacting with an absorbent solution low in acidic compounds,
    introducing a fluid in high-pressure liquid form into the exchanger, from which a fluid in high-pressure vapour form is withdrawn, and
    using the fluid in high-pressure vapour form as an energy source for operating the regeneration column by introducing the fluid in high-pressure vapour form into the regeneration column.

2. Process according to claim 1, in which the quality of the hot effluent rich in acidic compounds is controlled with the addition, to the combustion device, of at least one supplementary oxidizer.

3. Process according to claim 2, in which the at least one supplementary oxidizer is dioxygen $O_2$.

4. Process according to claim 1, in which the step of using the fluid in high-pressure vapour form as an energy source for operating the regeneration column comprises introducing the fluid in high-pressure vapour form into a reboiler of the regeneration column.

5. Process according to claim 4, in which the fluid in high-pressure vapour form has a condensation point 10° C. to 20° C. above an operating temperature of the reboiler.

6. Process according to claim 1, in which the quality of the operation of the regeneration column is controlled with the addition of a complementary fluid in supplementary high-pressure vapour form.

7. Process according to claim 1, which also comprises a step of reheating the incoming gaseous effluent before introducing it, in hot incoming gaseous effluent form, into the combustion device.

8. Process according to claim 7, in which the incoming gaseous effluent is reheated by introducing it into the exchanger, from which it is taken out in hot incoming gaseous effluent form.

9. Process according to claim 1, in which the incoming gaseous effluent is a flue gas from a previous combustion.

10. Process according to claim 1, in which the effluent rich in acidic compounds is stored underground.

11. Process according to claim 1, in which the fuel is a discard from waste or from biomass.

12. Process according to claim 1, in which the at least one acidic gas comprises at least one of the compounds including carbon dioxide $CO_2$.

\* \* \* \* \*